United States Patent
Brand et al.

(10) Patent No.: US 7,250,204 B2
(45) Date of Patent: Jul. 31, 2007

(54) USE OF HYDROXYALKYLPHENONE-TYPE PHOTOINITIATORS IN RADIATION-CURABLE ORGANOPOLYSILOXANES FOR PRODUCING ABHESIVE COATINGS

(75) Inventors: Mike Brand, Essen (DE); Hardi Döhler, Hattingen (DE); Winfried Hamann, Essen (DE); Jürgen Pomorin, Essen (DE)

(73) Assignee: Goldschmidt AG, Essen (DE)

( * ) Notice: Subject to any disclaimer, the term of this patent is extended or adjusted under 35 U.S.C. 154(b) by 92 days.

(21) Appl. No.: 10/685,141

(22) Filed: Oct. 14, 2003

(65) Prior Publication Data

US 2004/0082681 A1   Apr. 29, 2004

(30) Foreign Application Priority Data

Oct. 15, 2002  (DE) .............................. 102 48 111

(51) Int. Cl.
*B32B 9/04* (2006.01)
*B32B 33/00* (2006.01)

(52) U.S. Cl. ............... 428/41.4; 428/447; 428/448; 428/450; 522/99

(58) Field of Classification Search ............ 522/99; 528/20, 32; 428/447, 452
See application file for complete search history.

(56) References Cited

U.S. PATENT DOCUMENTS

| | | | |
|---|---|---|---|
| 4,356,265 A | 10/1982 | Hatano et al. | |
| 4,391,963 A | 7/1983 | Shirahata | |
| 4,507,187 A | 3/1985 | Jacobine et al. | |
| 4,534,838 A | 8/1985 | Lin et al. | |
| 4,587,276 A | 5/1986 | Lien et al. | |
| 4,956,221 A * | 9/1990 | Gutek ......................... | 428/142 |
| 5,621,020 A * | 4/1997 | Khatib et al. ................ | 522/99 |
| 5,776,658 A | 7/1998 | Niesert et al. | |
| 6,211,322 B1 | 4/2001 | Döhler et al. | |

FOREIGN PATENT DOCUMENTS

| | | |
|---|---|---|
| DE | 27 22 264 | 11/1978 |
| DE | 27 47 233 | 9/1980 |
| DE | 29 48 708 C2 | 6/1984 |
| DE | 38 10 140 C1 | 10/1989 |
| DE | 38 20 294 C1 | 10/1989 |
| EP | 0 088 842 | 1/1986 |
| EP | 0 162 572 | 1/1989 |
| EP | 332400 A2 * | 9/1989 |
| EP | 1 072 326 A2 | 1/2001 |
| JP | 62125825 A * | 8/1987 |
| JP | 10251356 A2 * | 9/1998 |
| WO | WO 97/49768 | 12/1997 |

OTHER PUBLICATIONS

Patent abstract for JP 62-125825.*
Computer translation of the Specification for JP 10-251356.*
D. Ruhlmann et al., "Relations Structure-Properties Dans Les Photoamorceurs De Polymerisation-2. Derives De Phenyl Acetophenone", Eur. Polym. J., vol. 28, No. 3, pp. 287-292, 1992.
J. P. Fouassier, "Polymerization Photoinitiators" Excited State Processes and Kinetic Aspects, Progress in Organic Coatings, vol. 18, pp. 229-252, 1990.
J. P. Fouassier, "Photochemical reactivity of UV radical photoinitiators of polymerization: A general discussion", Recent Res. Devel. Photochem. & Photobiol., vol. 4, pp. 51-74, 2000.
A. Kolar et al., "Photoinitiators with Functional Groups. Part II. Silicon-Containing Photoinitiators", J.M.S.—Pure Appl. Chem., A31(3), pp. 305-318, 1994.

* cited by examiner

*Primary Examiner*—Marc S. Zimmer
(74) *Attorney, Agent, or Firm*—Frommer, Lawrence & Haug LLP

(57) ABSTRACT

The present invention provides for the use of radiation-curable coating compositions comprising at least one radiation-curable organopolysiloxane having (meth)acrylic ester groups and a photoinitiator, wherein said photoinitiator includes at least one compound of the general formula

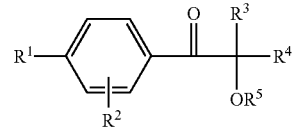

in which
$R^1$ is a linear or branched alkyl radical having 3 to 18 carbon atoms, preferably 4 to 12 carbon atoms,
$R^2$ is an alkyl radical having 1 to 4 carbon atoms, preferably hydrogen,
$R^3$, $R^4$ are alkyl radicals having 1 to 6 carbon atoms, which may also have been linked to form a 5- or 6-membered carbon ring or one of these radicals may also be hydrogen, and
$R^5$ is an alkyl or alkanoyl radical, preferably hydrogen;
for preparing adhesive coating materials and producing adhesive coatings.

7 Claims, No Drawings

USE OF HYDROXYALKYLPHENONE-TYPE PHOTOINITIATORS IN RADIATION-CURABLE ORGANOPOLYSILOXANES FOR PRODUCING ABHESIVE COATINGS

RELATED APPLICATIONS

This application claims priority to German application No. 102 48 111.3, filed Oct. 15, 2002, herein incorporated by reference.

BACKGROUND OF THE INVENTION

1. Field of the Invention

The invention relates to the use of radiation-curable coating compositions based on radiation-curing organopolysiloxanes with (meth)acrylic ester groups for the production of adhesive coatings which, for the purpose of photo-induced curing, comprise photoinitiators of the hydroxyalkylphenone type.

Adhesive coating compositions (release agents) are used to a wide extent to coat web materials to reduce their ability to adhere to adhesive surfaces.

Adhesive coating compositions are used, for example, to coat papers or films which are used as backings for self-adhesive labels. The labels, provided with a pressure-sensitive adhesive, do adhere to the coated surface to a sufficient extent to allow the label laminate to be handled. The adhesion of the adhesive labels to the backing must be sufficiently high that during label dispensing, e.g. to containers, the labels do not separate prematurely from their backing. On the other hand, however, the labels must be able to be peeled from the coated backing film without any substantial reduction of the adhesive tackiness. For this purpose the curing of the silicone release layer must be particularly effective, as otherwise silicone components may transfer to the adhesive surface and reduce tackiness. Further fields of applications of adhesive coating compositions are packaging materials which are used in particular for the packaging of sticky goods. Adhesive papers or films of this kind are used, for example, to pack foodstuffs or industrial products, such as e.g. bitumen.

A further application of adhesive coating compositions is in the production of self-stick closures, as for disposable diapers, for example. If the adhesiveness is too high, i.e., if the release force is too low, the diaper does not stay reliably closed. If the adhesiveness is too low and thus the release force too high, the closure can no longer be opened without destructive tearing of the diaper.

2. Description of the Related Art

The preparation of organosiloxanes with (meth)acrylate-modified organic groups attached to the siloxane unit via Si—O— and/or via Si—C— bonds is described in numerous patents. The patents and laid-open specifications below are given as representatives of the prior art and are herein incorporated by reference.

Organopolysiloxanes in which the (meth)acrylate-containing organic groups are attached to the polysiloxane framework via an Si—O—C— bond are described in DE-C-27 47 233 and DE-C-29 48 708.

Organopolysiloxanes where the acrylic ester-containing organic groups are attached to the polysiloxane framework via Si—C— bonds can be prepared, for example, by the hydrosilylation of a hydroxysiloxane with allyl glycidyl ether or another suitable epoxide having an olefinic double bond and, after the addition reaction, esterifying the epoxide with acrylic acid by opening the epoxide ring. This procedure is described in DE-C-38 20 294.

A further possibility of preparing (meth)acrylate-modified polysiloxanes with Si—C linkage of the modifying group(s) is the hydrosilylation of a hydroxysiloxane with an alcohol having an olefinic double bond, e.g., allyl alcohol, in the presence of a platinum catalyst and then to react the OH group of this alcohol with acrylic acid or with a mixture of acrylic acid and other saturated or unsaturated acids. This procedure is described, for example, in DE-C-38 10 140.

It is possible, furthermore, to attach in each case two or more (meth)acrylate groups per link to the silicone framework. In order to obtain very effective crosslinking—in other words, a very high number of reactive groups—while at the same time minimizing the density of modification on the siloxane framework it is desirable to attach more than one (meth)acrylate group per link. Processes of this kind are described, for example, in U.S. Pat. No. 6,211,322.

Examples of these organosilicone compounds are available, for example, from Goldschmidt/Germany under the product name TEGO® RC, from Shin Etsu/Japan under the name X-8010 and from Rhodia/France under the name UV 900, UV 911 and UV 970.

In order to produce said coatings the normal approach is to apply a mixture of two or more of said organosilicon compounds (and one or more photoinitiators) to web materials made of plastic, metals or paper and to pass the resulting material in web form from roll to roll, at high line speeds of several hundred meters per minute, through an UV unit to cure them.

In contrast to said organosilicon compounds various purely organic compounds, i.e. compounds not having silyl or siloxane units, are known which contain double bonds capable of free-radical polymerization and which after the addition of known photoinitiators cure by UV radiation. These coating compositions are used, for example, for printing inks and for preparing film-forming binders or for the coating of surfaces of plastic, of paper, of wood, and of metal.

A feature common to all said organosilicon compounds and organic compounds is that after the addition of photoinitiators, they cure within a very short time by UV irradiation in a free-radical polymerization. An overview of suitable photoinitiators is given in "J. P. Fouassier, Polymerization photoinitiators: Excited state process and kinetic aspects, Progress in Organic Coating, 18 (1990) 229-252", in "J. P. Fouassier, Photochemical reactivity of UV radical photoinitiators of polymerization: A general discussion, Recent Res. Devel. Photochem. & Photobiol., 4(2000):51-74", in "D. Ruhlmann et al, Relations structure-propriétés dans les photoamorceurs de polymérisation-2. Dérivés de Phenyl Acetophenone, Eur. Polym. J. Vol. 28, No. 3, pp. 287-292, 1992" und "K. K. Dietliker, Chemistry & Technology of UV & EB Formulation for Coatings, Inks & Paints, Volume 3, Sita Technology Ltd, UK". DE-A-27 22 264 describes hydroxyalkylphenones and their use as photoinitiators.

These literature references cite photoinitiators, including photoinitiators of the hydroxyalkylphenone type, and evaluate their reactivity in the stated organic compounds. The activity of photoinitiators is dependant on a multiplicity of factors, which are substantially also dependent on the photoreactive group and on the concentration of said group in the photoinitiator molecule—that is, on the ratio of the molar weight of the reactive group to the overall molar weight. The molar weight of the free-radical cleavage products and hence of the photoinitiator molecule itself is also of importance for the activity. These relationships are prior art, particularly for photoinitiators of the hydroxyalkylphenone type.

Photoinitiators must also be soluble in the coating composition in order to achieve a sufficient activity in UV curing. As a result of the very hydrophobic matrix of the stated organosilicon compounds, in contrast to the organic compounds, it is not possible to use a large number of the known photoinitiators, since they cannot be dissolved compatibly in the silicone matrix. Particularly suitable photoinitiators for the stated organosilicon compounds are, therefore, those which are liquid or easily meltable and which compatible blend to the silicone matrix.

In order to improve the solubility with the stated organosilicon compounds, WO-A-97/49768, U.S. Pat. No. 5,776, 658, U.S. Pat. No. 4,391,963 and EP-B-0 088 842, for example, propose photoinitiators modified with silyl radicals, including in particular polymer silyl radicals. The photoinitiators are, for example, of the hydroxyketone, aminoketone, benzoin ether, benzophenone or thioxanthone type. Patents U.S. Pat. No. 4,356,265, U.S. Pat. No. 4,534, 838 and EP-B-0 162 572 as well describe a very wide variety of photoinitiator structures provided with organopolysiloxane radicals. These compounds are derived, for example, from dialkoxyacetophenone and have an increased silicone solubility. U.S. Pat. No. 4,507,187 discloses diketo photoiniators with silyl groups as photoinitiators which are readily soluble in silicone polymers. Polymeric photoinitiators containing siloxane radicals are described in U.S. Pat. No. 4,587,276. A. Kolar et al in J.M.S. Pure Appl. Chem. A31(3) (1994), 305-318 on reactive silyl-derivatized hydroxyalkylphenone photoinitiators. EP-A-1 072 326 describes siloxane-modified photoinitiators with surface-active properties, which again are derivatives of hydroxyalkylphenone.

The literature references cited deal with solving the problem of the solubility of photoinitiators in the stated organosilicon compounds. Solubility is achieved by attachment of partly polymeric siloxane radicals to the photoreactive group. This solution has the drawback that the concentration of the photoreactive group is reduced, as a result of the high molar weight of the silyl or siloxane radical, to the extent that the solubility with the stated organosilicon compounds rises. In order to compensate the reduced concentration of the photoreactive group, it is necessary to admix increased concentrations of such photoinitiators to the stated organosilicon compounds. Moreover, the process steps needed for the attachment of the silyl or siloxane radicals constitutes an additional process step, which adds to the costs.

There is therefore a need to find, for the stated organosilicon compounds, a readily available, readily miscible, and compatible photoinitiator which is nevertheless equipped with a high concentration of photoreactive groups.

DESCRIPTION OF THE INVENTION

Surprisingly it has been found that photoinitiators of the hydroxyalkylphenone type of the general formula

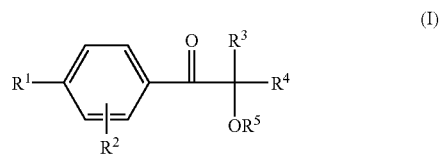

in which
$R^1$ is a linear or branched alkyl radical, preferably having 3 to 18 carbon atoms, most preferably 4 to 12 carbon atoms,
$R^2$ is an alkyl radical, preferably having 1 to 4 carbon atoms, or hydrogen,
$R^3$, $R^4$ are alkyl radicals, preferably having 1 to 6 carbon atoms, which may also have been linked to form a 5- or 6-membered carbon ring, or one of these radicals may also be hydrogen, and
$R^5$ is an alkyl or alkanoyl radical or hydrogen, are particularly suitable photoinitiators for the stated organosilicon compounds.

These photoinitiators are known per se but have been unable to establish themselves as photoinitiators for the stated organic coating compositions on account of the fact that, owing to the radicals $R^1$ and $R^2$, the concentration of the photoreactive group is markedly reduced and hence the reactivity toward compounds where both $R^1$, $R^2$ are hydrogen is reduced. Accordingly, only compounds where $R^1$, $R^2$ and $R^5$ are hydrogen and $R^3$, $R^4$ are methyl (e.g., Darocur® 1173 from Ciba Additives) or $R^1$, $R^2$ and $R^5$ are hydrogen and $R^3$, $R^4$ are cyclohexyl (e.g., Irgacur® 184 from Ciba Additives) have been widely used in the stated organic coating compositions. Analogous compounds in which $R^1$ is a linear or branched $C_3$ to $C_{18}$ alkyl radical are much less reactive in organic coating compositions owing to the concentration of the photoreactive group being reduced by up to 80%.

When these photoinitiators are used in organosilicon compounds, however, it has surprisingly been found that there is a markedly improved reactivity, without the drawbacks of the photoinitiators attached to siloxane chains as in EP-A-1 072 326.

The present invention accordingly provides for the use of radiation-curable coating compositions comprising at least one radiation-curable organopolysiloxane having (meth) acrylic ester groups and a photoinitiator, wherein said photoinitiator includes at least one compound of the general formula

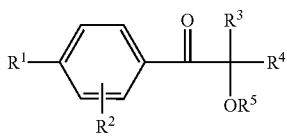

(I)

in which
R¹ is a linear or branched alkyl radical, preferably having 3 to 18 carbon atoms, more preferably 4 to 12 carbon atoms,
R² is an alkyl radical, preferably having 1 to 4 carbon atoms, or hydrogen,
R³, R⁴ are alkyl radicals, preferably having 1 to 6 carbon atoms, which may also have been linked to form a 5- or 6-membered carbon ring, or one of these radicals may also be hydrogen, and
R⁵ is an alkyl or alkanoyl radical, or hydrogen, for preparing adhesive coating materials and producing adhesive coatings.

The photoinitiators can be used alone or as mixtures with one another, where appropriate with other, noninventive photoinitiators and/or photosensitizers, in fractions of preferably from about 0.01 to about 10% by weight, in particular from about 0.1 to about 5% by weight, based on the weight of the stated organopolysiloxanes.

Advantages in the UV curing of the stated organo silicone compounds and the photoinitiators used in accordance with the invention over, for example, the hydroxyalkylphenones attached chemically to siloxane chains, as in EP-A-1 072 326, include the following:
  addition of the photoinitiators of the invention in very small amounts is possible;
  curing of the products on substrates at a markedly increased rate;
  improved through-curing of the resulting adhesive coatings and hence a smaller fraction of potentially migratable silicone constituents, which can transfer to the adhesive and impair its properties;
  changes in the adhesiveness of cured products on storage, discernable from an increase of the release forces, occur only to a negligible extent, if at all.

The curable mixtures of the invention can be used as radiation-curing coating materials or as additives to such systems. They can be compounded conventionally with other curing initiators, photosensitizers, stabilizers, antioxidants, fillers, pigments, other acrylate systems, known per se, and further customary additives. Stabilizers and antioxidants are in particular those which scavenge oxygen or are able to break down peroxides, such as phosphites, for example, especially trialkyl, triaryl or alkyl-aryl-phosphites. They can be crosslinked three-dimensionally by free-radicals and cure within a very short time under the impact of high-energy radiation such as UV light to give films possessing chemical and mechanical resistance.

EXAMPLES

The examples below are intended to illustrate the invention, but do not constitute any restriction whatsoever.

Performance Testing:

To test the performance properties of the curable mixtures the mixtures of the invention and also the noninventive, comparative examples have the respective photoinitiator added to them and are then applied to a web material (oriented polypropylene film) and are cured by exposure to UV light from a state of the art, medium-pressure mercury vapor lamp with a UV output of 50 W/cm under nitrogen inerting with a controlled residual oxygen content of <50 ppm at the web speed of 200 m/min. The silicone coat weight is in each case approximately 1 g/m².

Release Value:

To determine the release values a 25 mm wide adhesive tape is used which has been coated with a rubber adhesive and is available commercially as TESA® 7476 from Beiersdorf.

In order to measure the adhesiveness, these adhesive tapes are rolled onto the substrate and subsequently stored at 40° C. under a weight of 70 g/cm². After 24 hours the force required to remove the respective adhesive tape from the substrate at a peel angle of 180° and at a peel rate of 30 cm/min is measured. This force is termed the release force or release value. The general test procedure corresponds essentially to test method 10 of the "Fédération Internationale des Fabricants et Transformateurs D'Adhésifs et Thermocollants sur Papier et autres Supports" (FINAT).

Loop-Test:

The purpose of the loop test is to determine fast and easy the degree of curing of a release coating. For this purpose a strip about 20 cm long of the adhesive tape TESA® 4154 from Beiersdorf is rolled 3 times onto the substrate and removed again immediately by hand. Then a loop is formed by placing the ends of the adhesive tape together, so that the adhesive faces of both ends are in contact over an extent of about one centimeter. The ends are then parted again by hand, during which the contact area should move uniformly to the center of the adhesive tape. In the case of contamination with poorly cured release material the bond strength of the adhesive tape is no longer sufficient to maintain the contact area when the ends are pulled apart. In this case the test is said to have been failed.

Subsequent Adhesion:

The subsequent adhesion is determined largely in accordance with FINAT Test Method No. 11. For this purpose the adhesive tape TESA® 7475 from Beiersdorf is rolled onto the substrate and then stored at 40° C. under a weight of 70 g/cm². After 24 hours the adhesive tape is separated from the release substrate and rolled onto a defined substrate (steel plate, glass plate, plastic film). After one minute a measurement is made of the force required to peel the adhesive tape from the substrate at a peel rate of 30 cm/min and a peel angle of 180°. The value thus measured is divided by the value given by an untreated adhesive tape under otherwise identical test conditions. The result is termed the subsequent adhesion and is generally indicated as a percentage. Figures of more than 80% are considered by the skilled worker to be adequate, and suggest effective curing.

Radiation-Curing Organosilicon Compounds:

As radiation-curing organosilicon compounds products from the company Goldschmidt, available under the brand name TEGO® RC, are used. The product TEGO® RC 902 (in accordance with U.S. Pat. No. 6,211,322) has a very good adhesive effect in the cured coating toward sticky substances. The amount of double bonds capable of polymerization is very low. TEGO® RC 902 is blended with TEGO® RC 711 (in accordance with DE-A-38 20 294) in order to improve the substrate adhesion. TEGO® RC 711 has a higher amount of double bonds capable of polymerization and accordingly, applied on its own, also has a reduced adhesiveness in the cured coating toward sticky substances. As an example of said radiation-curing organosilicon compounds a mixture of RC 902 and RC 711 in a 70:30 ratio is prepared and is mixed with photoinitiator as per each example.

Photoinitiators Used:

The photoinitiators used in accordance with the invention and also the comparative examples contain as photoreactive group the molecular moiety

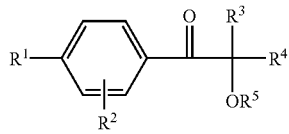

Photoinitiator No. 3
with
$R^1$, $R^2$=H;
$R^3$, $R^4$=CH$_3$;
$R^5$=H and can therefore be regarded as a reference for the fraction of the photoreactive group in the photoinitiator. This fraction, accordingly, can be expressed by the ratio (molar weight of photoinitiator no. 3 times number of reactive groups in the molecule) divided by (molar weight of the photoinitiator in question).

Photoinitiators constitute a high cost factor. Large amounts of added photoinitiator may also adversely affect the release properties. The photoinitiator should therefore be added in very low concentrations. In practice, amounts of about 2% by weight of photoinitiator no. 3, based on curable polymer, have proven suitable. Accordingly, this is the guideline amount used for assessing the performance properties in the examples.

Photoinitiator No. 1

Inventive Photoinitiator

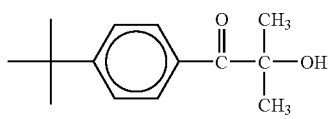

$R^1$=tert-butyl;
$R^2$=H;
$R^3$, $R^4$=CH$_3$;
$R^5$=H with a molar weight of 220 g/mol; fraction of photoreactive group: 0.75.

Photoinitiator No. 2:

Inventive Photoinitiator

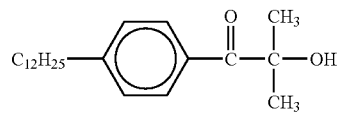

with
$R^1$=C$_{12}$H$_{25}$;
$R^2$=H;
$R^3$, $R^4$=CH$_3$;
$R^5$=H and an average molar weight of 330 g/mol.

As a result of the preparation process the alkyl radical $R^1$ has a homolog distribution of C$_9$H$_{19}$ to C$_{15}$H$_{31}$ with a maximum at C$_{12}$H$_{25}$. The alkyl radicals are in each case a mixture of linear and branched alkyl; fraction of photoreactive group: 0.5.

Photoinitiator No. 3

Noninventive Photoinitiator:

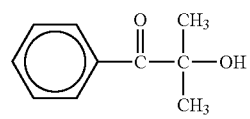

with
$R^1$, $R^2$=H;
$R^3$, $R^4$=CH$_3$;
$R^5$=H as control.

The compound is available as a commercial product from Ciba Additives under the name Darocur® 1173. This photoinitiator has a molar weight of 164.2 g/mol; fraction of photoreactive group, by definition: 1.

Photoinitiator No. 4:

Noninventive Photoinitiator According to EP-A-1 072 326

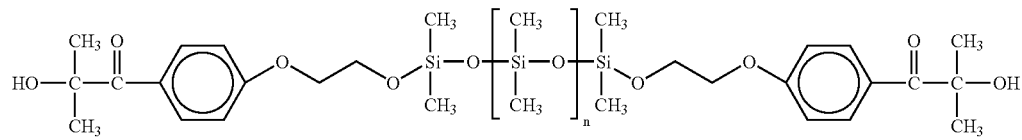

with
$R^2$=H;
$R^3$, $R^4$=CH$_3$;
$R^5$=H n on average=7 and an average molar weight of approximately 1100 g/mol; fraction of photoreactive group: 0.3.

Test Series 1:

In this test series the amount of the respective photoinitiators added was calculated so that the concentration of photoreactive group in the radiation-curing organosilicon compounds is the same in all the examples.

| Example | Photo-initiator | Fraction of photo-reactive group in the mixture of radiation-curing organosilicon compounds % | Addition of photoinitiator in % by weight | Residual oxygen during UV curing ppm |
|---|---|---|---|---|
| 1 | No. 1 | 2 | 2.67 | 25 |
| 2 | No. 2 | 2 | 4 | 25 |
| 3 | No. 3 | 2 | 2 | 25 |
| 4 | No. 4 | 2 | 6.67 | 25 |

Performance Testing of Test Series 1:

| Example | Loop Test*) | Subsequent adhesion % | Release value after 24 hours TESA ® 7476 cN/2.5 cm |
|---|---|---|---|
| 1 | + | 96 | 45 |
| 2 | + | 97 | 46 |
| 3 | − | 57 | 40 |
| 4 | − | 63 | 42 |

*)+ = pass;
− = fail

These examples reveal that, with the same concentration of photoreactive group, the inventive photoinitiators allow much better curing of the silicone composition as compared with the control.

Test Series 2

In this test series the amount of each photoinitiator added was set at 2 percent by weight. As a result, the concentrations of photoreactive group in the radiation-curing organosilicon compounds are different.

| Example | Photo-initiator | Fraction of photoreactive group in the mixture of radiation-curing organosilicon compounds % | Addition of photoinitiator in % by weight | Residual oxygen during UV curing ppm |
|---|---|---|---|---|
| 5 | No. 1 | 1.5 | 2 | 25 |
| 6 | No. 2 | 1 | 2 | 25 |
| 7 | No. 3 | 2 | 2 | 25 |
| 8 | No. 4 | 0.6 | 2 | 25 |

Performance Testing of Test Series 2:

| Example | Loop Test*) | Subsequent adhesion % | Release value after 24 hours TESA ® 7476 cN/2.5 cm |
|---|---|---|---|
| 5 | + | 91 | 51 |
| 6 | + | 90 | 53 |
| 7 | − | 57 | 40 |
| 8 | − | 42 | 41 |

*)+ = pass;
− = fail

From these examples it surprisingly becomes clear that, with the same initial weight of the respective photoinitiator (and thus different concentrations of the photoreactive group) the inventive photoinitiators continue to allow much better curing of the silicone composition as compared with the control, photoinitiator No. 3.

The above description is intended to be illustrative and not limiting. Various changes and modifications in the embodiments described herein may occur to those skilled in the art. Those changes can be made without departing from the scope or spirit of the invention.

What is claimed is:

1. A self-adhesive tape with a backing comprising a web material which is at least partially coated with an adhesive coating obtained by curing a radiation curable coating composition comprising at least one radiation-curable organo-polysiloxane having (meth)acrylic ester groups and at least one photoinitiator, wherein at least one of the photoinitiator(s) is a compound of the general formula (I)

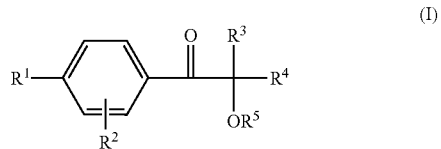

$R^1$ is a linear or branched alkyl radical having 4 to 12 carbon atoms,
$R^2$ is H or an alkyl radical having 1 to 4 carbon atoms,
$R^3$, $R^4$ are H or alkyl radicals, which may also have been linked to form a 5- or 6-membered carbon ring, and
$R^5$ is H or an alkyl or alkanoyl radical.

2. The web material according to claim 1, which is made of plastic, metal or paper.

3. A process of applying an adhesive coating on a web material to form the self-adhesive tape of claim 1 which comprise applying a radiation curable organopolysiloxane having methacrylate ester groups containing a photoinitiator to web materials made of plastic, metal or paper and to pass the resulting material through an UV curing unit, wherein the at least one photoinitiator is a compound of the general formula (I)

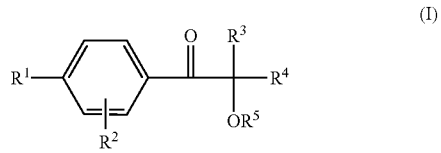

in which
- $R^1$ is a linear or branched alkyl radical having 4 to 12 carbon atoms,
- $R^2$ is H or an alkyl radical having 1 to 4 carbon atoms,
- $R^3$, $R^4$ are H or alkyl radicals, which may also have been linked to form a 5- or 6-membered carbon ring, and
- $R^5$ is H or an alkyl or alkanoyl radical.

4. The process of claim 3, wherein at least one of the photoiniator(s) is a compound of the general formula (I) wherein $R^2$, $R^5$=H.

5. The process of claim 3, wherein at least one of the photoinitiator(s) is a compound of the general formula (I) in which $R^3$, $R^4$=CH$_3$.

6. The process of claim 3, wherein at least one of the photoinitiator(s) of the general formula (I) is present in amounts of from about 0.01 to about 10% by weight, based on the weight of the acrylate-functional silicone component.

7. The process of claim 3, which comprise a second photoinitiator not of the general formula (I), wherein the two photoinitiators are present in amounts of from about 0.1 to about 5% by weight, based on the weight of the acrylate-functional silicone compositions.

* * * * *